(12) United States Patent
Starr et al.

(10) Patent No.: US 7,177,723 B2
(45) Date of Patent: Feb. 13, 2007

(54) OPERATIONAL OPTIMIZATION AFTER POWERING ON A ROBOTIC DATA STORAGE LIBRARY

(75) Inventors: Matthew T. Starr, Lafayette, CO (US); Joshua D. Carter, Lafayette, CO (US); Nathan C. Thompson, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 596 days.

(21) Appl. No.: 10/604,969

(22) Filed: Aug. 28, 2003

(65) Prior Publication Data

US 2005/0063089 A1    Mar. 24, 2005

(51) Int. Cl.
G05B 15/00 (2006.01)
G05B 19/00 (2006.01)

(52) U.S. Cl. ............ 700/264; 700/247; 700/248; 700/251; 700/257; 700/258; 700/259; 700/260; 700/261; 700/262; 700/245; 318/568.11; 318/568.12; 318/568.13; 318/568.16; 318/568.21; 318/568.25; 606/1; 606/102; 606/130; 606/139; 600/117; 600/118; 600/407; 600/426; 600/429; 600/587; 600/595; 901/1; 901/2; 901/27

(58) Field of Classification Search ............ 700/245, 700/264
See application file for complete search history.

(56) References Cited

U.S. PATENT DOCUMENTS

| | | | |
|---|---|---|---|
| 4,204,249 A * | 5/1980 | Dye et al. ............ 713/330 |
| 5,429,470 A * | 7/1995 | Nicol et al. ............ 414/331.05 |
| 5,815,409 A * | 9/1998 | Lee et al. ............ 700/286 |
| 6,216,057 B1 | 4/2001 | Jesionowski ............ 700/214 |
| 6,236,626 B1 | 5/2001 | Nagai ............ 369/34 |
| 6,366,987 B1 * | 4/2002 | Tzelnic et al. ............ 711/162 |
| 6,574,740 B1 * | 6/2003 | Odaohhara et al. ............ 713/323 |
| 6,577,562 B2 | 6/2003 | Gallo et al. ............ 369/30.63 |
| 6,885,911 B1 * | 4/2005 | Smith ............ 700/245 |
| 6,895,300 B2 * | 5/2005 | Goodman et al. ............ 700/213 |
| 7,010,387 B2 * | 3/2006 | Lantry et al. ............ 700/214 |
| 2002/0091807 A1 * | 7/2002 | Goodman ............ 709/221 |

(Continued)

FOREIGN PATENT DOCUMENTS

WO    WO 2005/010661 A2    2/2005

(Continued)

OTHER PUBLICATIONS

U.S. Appl. No. 10/950,613, Starr et al.

(Continued)

Primary Examiner—Thomas Black
Assistant Examiner—McDieunel Marc

(57) ABSTRACT

A robotic storage library is provided for reducing the transition time to reach an operational state following a transition from a power-off to a power-on state. The robotic storage library can generally include a transport unit for moving data cartridges, or other storage elements, between a location in a shelf system and a drive, or data transfer interface, to complete storage operations for a host computer. The library can further include a controller for causing an audit to be performed to create an inventory of the locations. The audit can be stored in nonvolatile memory prior to the power transition. The inventory information can be transmitted to a host computer after the power transition.

40 Claims, 12 Drawing Sheets

U.S. PATENT DOCUMENTS

| | | |
|---|---|---|
| 2004/0105187 A1 | 6/2004 | Woodruff et al. |
| 2004/0153205 A1* | 8/2004 | Goodman et al. .......... 700/214 |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0047258 A1* | 3/2005 | Starr et al. .................. 365/232 |
| 2005/0057847 A1 | 3/2005 | Armagost et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1* | 11/2005 | Lantry et al. ............... 711/111 |
| 2005/0267627 A1* | 12/2005 | Lantry et al. ............... 700/214 |

FOREIGN PATENT DOCUMENTS

| | | |
|---|---|---|
| WO | PCT/US05/45168 | 12/2005 |
| WO | PCT/US05/46447 | 12/2005 |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.

* cited by examiner

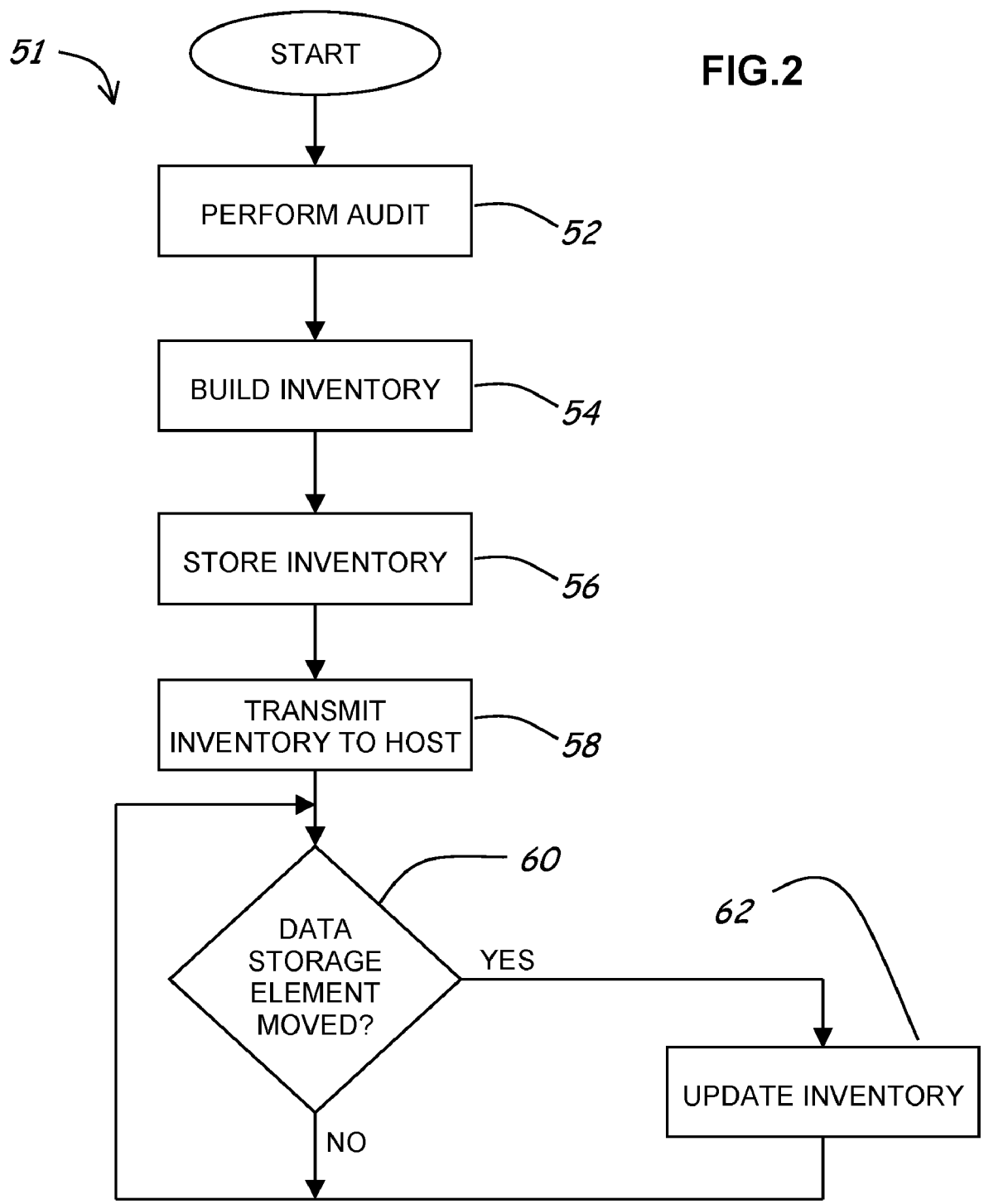

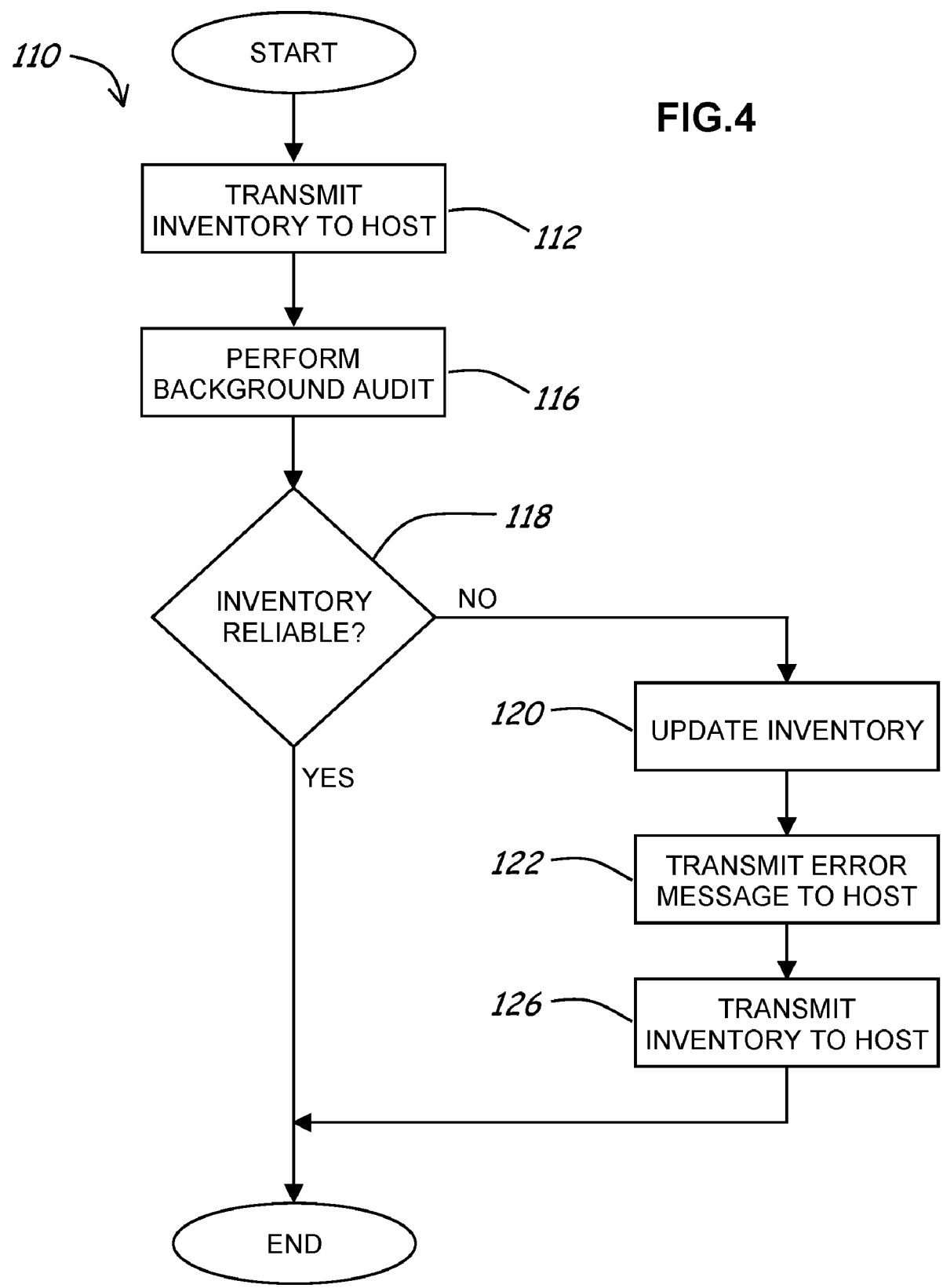

OPERATIONAL OPTIMIZATION AFTER POWERING ON A ROBOTIC DATA STORAGE LIBRARY

FIELD OF THE INVENTION

The present invention is directed to a robotic data storage library that is useful in writing data to a data storage element and/or reading data from a data storage element, and, more particularly, to such libraries with the ability to reduce the transition time to reach an operational state after a transition of the library from a power-off state to a power-on state.

BACKGROUND OF THE INVENTION

Presently, robotic data storage libraries are primarily used to archive data, i.e., store data that is not immediately needed by a host computer, and provide archived data to the host computer when the data is needed. A typical robotic data storage library receives data from a host computer and causes the data to be written to a recording medium of a data storage element. When the host computer requires some of the data that was previously written to a data storage element, a request for the data is sent from the host computer to the library. In response, the library locates the data storage element, reads the data from the data storage element, and transmits the data to the host computer system.

Most robotic data storage libraries are currently comprised of: (a) a plurality of storage locations for holding the data storage elements; (b) a data transfer interface capable of establishing a communication path with a data storage element so that data can be transferred between the data storage element and the host computer; and (c) a transport unit for moving a data storage element between one of the storage locations and the data transfer interface.

One example of a robotic data storage library is a tape cartridge library. In a tape cartridge library, for example, the library comprises a plurality of shelf structures comprising slots for holding tape cartridges, a drive for writing data to and/or reading data from the tape housed in the tape cartridges and a robot for transporting the tape cartridges between the storage slots and the tape drive. When a host computer provides data for archival purposes to the tape cartridge library, the robot retrieves a tape cartridge from a storage slot and transports the tape cartridge to the drive. The drive writes the data onto the tape in the tape cartridge. When the drive has completed writing the data onto the tape, the robot retrieves the tape cartridge from the drive and places the tape cartridge into a storage slot for later access.

When the host computer requests the archived data, the tape cartridge library locates the tape cartridge in which the requested data is stored. The robot retrieves the tape cartridge from a storage location and transports the tape cartridge to a drive. The drive reads the data from the tape in the tape cartridge and the tape cartridge library provides the data to the host computer. After the data has been read from the tape in the tape cartridge, the robot retrieves the tape cartridge from the drive and transports the tape cartridge to a storage slot.

When a typical robotic data storage library is transitioned from a power-off state to a power-on state, the robotic data storage library is not immediately ready for operation (i.e., is not in an operational state). To be operational, the host computer requires an inventory of the library that identifies items within the library (e.g., tape cartridges) and the locations of each item within the library. The host computer needs the inventory so that the host computer can issue instructions to the library relating to the items identified in the inventory. So, for example, an inventory may include the identity and the storage location of a particular tape cartridge and the identity and location of a tape drive that can read/write data from/to a tape within the particular tape cartridge. With this inventory, the host computer is able to issue a command to tell the library to have the tape cartridge moved from the storage location to the drive.

As a consequence, after a transition of a library from a power-off state to a power-on state, a host computer typically issues a command to the library requesting that the library perform an audit of the library to generate an inventory and provide the inventory to the host computer so that the library is in an operational state relative to the host computer. The library performs an audit of locations within the library to create an inventory to present to the host computer. Only after the library has performed this audit and provided the inventory to the host computer does the library reach an operational state. An audit of a robotic data storage library, for example, may include checking each storage location to determine if a data storage element is present in each location and, if so, identifying the data storage element. The audit may further include a search for various data transfer interfaces (such as drives, ports, etc.) and for one or more transport units to identify the data transfer interfaces and transport units present in the library to create the inventory.

SUMMARY OF THE INVENTION

As libraries become larger and more complex, the time to perform an audit increases, thus increasing the time required to transition a library to an operational state after a transition from a power-off state to a power-on state. The present invention is directed to a robotic data storage library with the ability to reduce the transition time of a robotic data storage library to reach an operational state after a transition of a robotic data storage library from a power-off state to a power-on state.

In one embodiment, a robotic data storage library is provided that is capable of operating with at least one data storage element and with the ability to reduce the transition time to reach an operational state after a transition of the library from a power-off state to a power-on state. For example, an embodiment of a robotic data storage library with the ability to reduce the transition time to reach an operational state after a transition of the library from a power-off state to a power-on state comprises: (1) a plurality of storage locations, each capable of holding at least one data storage element; (2) a data transfer interface for receiving a data storage element and establishing a communication path with a data storage element so that data can be transferred between the data storage element and a host computer; (3) a transport unit for moving a data storage element between one of the plurality of storage locations and the data transfer interface; (4) a nonvolatile memory for storing an inventory of locations of the robotic data storage library; and (5) a controller for causing an audit to be performed to create an inventory, causing the inventory to be stored in the nonvolatile memory prior to a transition of the robotic data storage library from a power-off state to a power-on state, and causing the inventory to be transmitted to a host computer after the transition of the robotic data storage library from a power-off state to a power-on state.

The nonvolatile memory allows the robotic data storage library to store the inventory over a power cycle in which power to the memory of the library is interrupted. After a transition from a power-off state to a power-on state, one embodiment of a library retrieves an inventory from the nonvolatile memory. The library provides the inventory retrieved from the nonvolatile memory to a host computer without having to perform an audit to create the inventory on each transition from a power-off state to a power-on state of the library. Thus, the library has the ability to reduce the transition time required to reach an operational state relative to the host computer following a transition of the library from a power-off state to a power-on state.

In one embodiment, for example, the robotic data storage library comprises a magazine-based library. In the magazine-based robotic data storage library, the plurality of storage locations comprise a location capable of holding a magazine, and the transport unit is adapted to move a magazine to and from the location. Further, the controller is adapted to create an inventory comprising locations capable of holding a magazine. In another embodiment, the controller is adapted to create an inventory comprising the inventory of locations capable of holding a magazine and an inventory of locations capable of holding a data storage element within a magazine.

In another embodiment, a method is provided for reducing the transition time in a robotic data storage library to reach an operational state after a transition of the library from a power-off state to a power-on state comprising: (1) providing a robotic data storage library comprising: a plurality of storage locations, each capable of holding at least one data storage element, a data transfer interface for receiving a data storage element and establishing a communication path with a data storage element so that data can be transferred between the data storage element and a host computer, and a transport unit for moving a data storage element between one of the plurality of storage locations and the data transfer interface; (2) auditing the robotic data storage library to create an inventory of locations of the robotic data storage library; (3) storing the inventory in a nonvolatile memory prior to a transition of the robotic data storage library from a power-off state to a power-on state; (4) transitioning the robotic data storage library from a power-off state to a power-on state; (5) making, following the step of transitioning, a determination about the reliability of the inventory stored in the nonvolatile memory; and (6) transmitting, following the step of transitioning and based upon the determination comprising an indication of reliability of the inventory, the inventory to the host computer.

Another embodiment of a method for reducing the transition time required to reach an operational state of a robotic data storage library after a transition of the library from a power-off state to a power-on state comprises: (1) providing a robotic data storage library comprising: a plurality of storage locations, each capable of holding at least one data storage element, a data transfer interface for receiving a data storage element and establishing a communication path with a data storage element so that data can be transferred between the data storage element and a host computer, and a transport unit for moving a data storage element between one of the plurality of storage locations and the data transfer interface; (2) auditing the robotic data storage library to create an inventory of locations of the robotic data storage library; (3) storing the inventory of the robotic data storage library in a nonvolatile memory prior to a transition from a power-off state to a power-on state; (4) transitioning the robotic data storage library from a power-off state to a power-on state; (5) transmitting, following the step of transitioning, the inventory to the host computer; and (6) performing, following the step of transitioning, a background audit of the robotic data storage library.

BRIEF DESCRIPTION OF THE DRAWINGS

FIG. 2 shows a flow diagram of one embodiment of a method for building an inventory for a robotic data storage library;

FIG. 4 shows a flow diagram of a third embodiment of a method for reducing the transition time to reach an operational state of a robotic data storage library after a transition from a power-off state to a power-on state;

DETAILED DESCRIPTION

Figure 1:
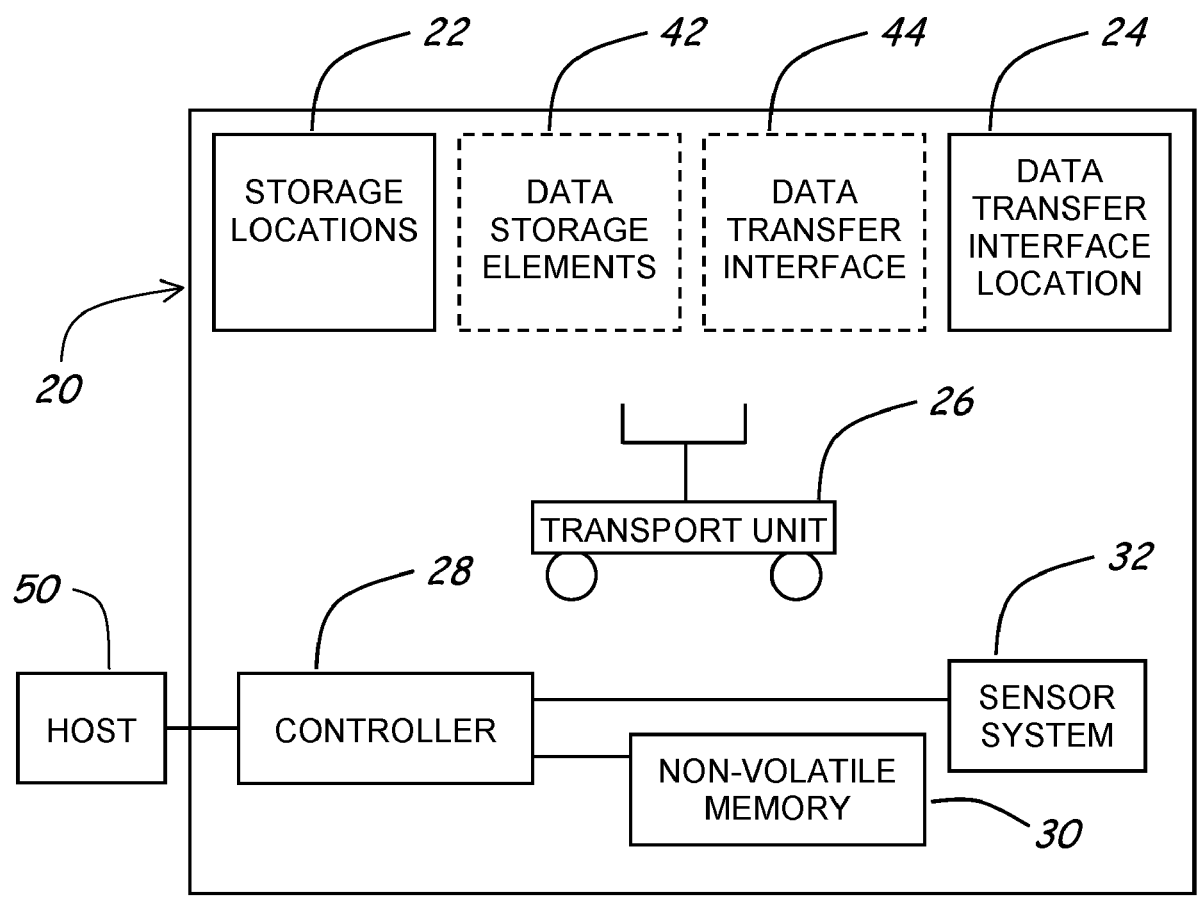
FIG. 1 shows a block diagram of a robotic data storage library with the ability to reduce the transition time to reach an operational state after a transition from a power-off state to a power-on state.

FIG. 1 shows a block diagram of a robotic data storage library 20. The robotic data storage library 20 comprises a plurality of storage locations 22, a data transfer interface location 24, a transport unit 26, a controller 28, a nonvolatile memory 30 and a sensor system 32. A functional robotic data storage library may further comprise additional elements such as a plurality of data storage elements 42 and one or more data transfer interfaces 44 shown in broken lines in FIG. 1. The plurality of data storage elements 42, for example, may be used by a functional robotic data storage library to store data from and provide data to a host computer. A data transfer interface 44 may be installed in a robotic data storage library 20 at a data transfer interface location 24 to establish a communication path with a data storage element 42 so that data can be transferred between the data storage element 42 and a host computer 50. The plurality of data storage elements 42 and the data transfer interface 44 are shown in broken lines to indicate that these elements are not requirements of a robotic data storage library 20, but rather may be added to the robotic data storage library 20 to make it functional.

The plurality of storage locations 22 comprises any location capable of holding at least one data storage element 42 when it is not in communication with a data transfer interface 44 and it is not residing at the transport unit 26. A data storage element 42 may comprise any type of media on which data may be written to and/or read from by a data transfer interface 44 installed in a robotic data storage library 20. A data storage element, for example, may comprise a tape, a tape cartridge, a tape pack, a tape drive, a tape drive pack, a disk, a disk cartridge, a disk pack, a disk drive, a disk drive pack, a memory stick, a memory card, or any other data storage device that may be used to write data to and/or read data from by a data transfer interface 44. A storage location 22 may be fixed or movable and be adapted to hold one or more data storage elements 42. For example, a storage location may comprise a support structure sized and shaped to hold a single data storage element or to hold a plurality of data storage elements. The support structure may comprise, for example, a shelf, a slot, a rail, a clip, a drawer, a moveable magazine, or a structure, such as a shelf, a slot, a rail, a clip or a drawer, within a moveable magazine for holding at least one data storage element 42. In one embodiment, a storage location may hold another storage location, which in turn holds a data storage element 42. In a magazine-based robotic data storage library, for example, a storage location 22 may comprise a structure such as a shelf for supporting a movable magazine, which in turn comprises a plurality of storage locations 22 that can hold one or more data storage elements 42.

The plurality of storage locations 22 may also be partitioned to comprise two or more individual partitions of storage locations 22. Each of the partitions may comprise a physical address and a logical address. The partitions may be seen by one or more host computers 50 as independent robotic data storage libraries by their logical addresses although they are packaged together in one physical robotic data storage library.

The data transfer interface location 24 comprises a location at which a data transfer interface 44 can reside within a robotic data storage library 20. The data transfer interface location 24, for example, may comprise any location within the robotic data storage library 20 that may be used to locate and/or identify a data transfer interface 44 that is installed within the robotic data storage library 20. The data transfer interface location 24 may comprise, for example, a support structure sized and shaped to hold a one or more data transfer interfaces 44, a connection for establishing a communications path with one or more data transfer interfaces 44, or may comprise any structure within the robotic data storage library 20 that may be used to locate and/or identify one or more data transfer interfaces 44 installed in the robotic data storage library 20. A support structure may comprise, for example, a shelf, a slot, a rail, a clip, a connector, a drawer, or other structure that may support and/or hold a data transfer interface 44 within the robotic data storage library 20. A connection may comprise, for example, a port, a connector, a network or other link for establishing a communications path with a data transfer interface 44.

A data transfer interface 44, which may be installed in the robotic data storage library 20, receives a data storage element and establishes a communication path with the data storage element so that data can be transferred between the data storage element and a host computer. A data transfer interface 44, for example, may comprise a drive, such as a tape or disk drive for receiving a data storage element, or may comprise an interface port to which a data storage element, such as a tape or disk drive or drive pack, may be connected to establish a communication path with the storage medium of the data storage element.

The transport unit 26 comprises an assembly for moving a data storage element 42 between one of the plurality of storage locations 22 of the robotic data storage library 20 and a data transfer interface 44 installed within the robotic data storage library 20. The transport unit 26, for example, may comprise a robot for moving a data storage element 42 between a storage location 22 of the robotic data storage library 20 and a data transfer interface 44 installed in the robotic data storage library 20. In a cartridge-based library, for example, the transport unit 26 may comprise a robot comprising a cartridge picker for grasping a cartridge and moving the cartridge between a storage location 22 of the robotic data transfer library 20 and a data transfer interface 44 installed within the robotic data storage library 20 and a drive installed in the robotic data storage library 20. In a magazine-based cartridge library, however, the transport unit 26 may not only comprise a robot or other unit for grasping and moving a cartridge between a storage location of a magazine (e.g., a slot within a magazine) and a data transfer interface 44, but may further comprise a magazine picker for grasping and moving a magazine to and from a storage location 22.

The controller 28 can communicate with the nonvolatile memory 30, the sensor system 32 and a host computer 50. The controller 28 can access information stored in the nonvolatile memory 30, cause information stored within the nonvolatile memory 30 to be transmitted to a host computer 50 and cause information to be stored within the nonvolatile memory 30.

In one embodiment, the controller 28 may also communicate with the transport unit 26 as shown in broken lines in FIG. 1.

The controller can also control the operation of the sensor system 32. The sensor system 32 may comprise any sensing apparatus for determining the location and identity of certain items within the robotic data storage library. The sensor system 32 may comprise, for example, one or more physical sensors for locating and/or identifying an item within the robotic data storage library 20. In a cartridge-based robotic data storage library, for example, a sensor system may comprise a scanner, such as a barcode scanner, that is used to scan one or more cartridges located at a storage location 22, a transport unit 26 or in a data transfer interface 44, such as a drive. The scanner of this embodiment may further be controlled to scan one or more data transfer interfaces 44 and/or transport unit 26 to determine the location and identity of a data transfer interface 44 and/or a transport unit 26 within a robotic data storage library 20.

In one embodiment, for example, one or more sensors may detect the presence and/or identity of a data storage element 42 located at a storage location 22. The sensor(s) may be fixed in the robotic data storage library 20, may be mounted on a movable component of the robotic data storage library 20, such as the transport unit 26, or may be attached to a data storage element 42 itself. For example, a sensor may be fixed at a storage location (whether or not that storage location is fixed or mobile), positioned to detect the presence and/or identity of a data storage element 42 at a storage location, or positioned to detect a data storage element 42 moving to or from a storage location 22. A sensor may also be mounted on a moveable component of the robotic data storage library 20, such as the transport unit 26, and positioned to detect the presence and/or identity of a data storage element 42 located at a storage location 20. For example, a transport unit 26 may comprise a sensor that can detect the presence and/or identity of a data storage element 42 located at a storage location 22 or may detect the presence and/or identity of a data storage element 42 that has been retrieved from a storage location 22 to the transport unit 26. The sensor may also be fixed at a location of a robotic data storage library 20 where, after a data storage element 42 is retrieved from a storage location 22 by the transport unit 26, the transport unit 26 may move the data storage element 42 to the sensor to detect the presence and/or identity of the data storage element 42 and return the data storage element 42 to the storage location 22. One or more sensors may also be attached to a data storage element 42 that is capable of determining the location of the data storage element 42 at a storage location 22 of the robotic data storage library 20 and/or identifying the data storage element 42 to the controller 28 of the robotic data storage library 20.

In another embodiment, one or more sensors may detect the presence of a data storage element 42 located at a data transfer interface 44. Again, the sensor(s) may be fixed in the robotic data storage library 20, may be mounted on a movable component of the robotic data storage library 20, such as the transport unit 26, or may be attached to a data storage element 42 itself. For example, the sensor(s) may be fixed at a data transfer interface 44, positioned to detect the presence and/or identity of a data storage element 42 at a data transfer interface 44, or positioned to detect a data storage element 42 moving to and from a data transfer interface 44. A sensor may also be mounted on a moveable component of the robotic data storage library 20, such as transport unit 26, and positioned to detect the presence and/or identity of a data storage element 42 located at a data transfer interface 44. For example, a transport unit 26 may comprise a sensor that can detect the presence and/or identity of a data storage element 42 located at a data transfer interface 44 or may detect the presence and/or identity of a data storage element 42 that has been retrieved from a data transfer interface 44 to the transport unit 26. The sensor may also be fixed at a location of a robotic data storage library 20 where, after a data storage element 42 is retrieved from a data transfer interface 44 by the transport unit 26, the transport unit 26 may move the data storage element 42 to the sensor to detect the presence and/or identity of the data storage element 42. One or more sensors may also be attached to a data storage element that is capable of determining the location of the data storage element at a data transfer interface 44 within the robotic data storage library 20 and/or identifying the data storage element 42 to the controller 28 of the robotic data storage library 20.

One or more sensors may detect the presence of a data storage element 42 at the transport unit 26. The sensor(s) may be fixed in the robotic data storage library 20, may be mounted on a movable component of the robotic data storage library 20, or may be attached to a data storage element 42 itself. For example, the sensor(s) may be fixed to the transport unit 26 to detect the presence and/or identity of a data storage element 42 located at the transport unit 26, positioned to detect the presence and/or identity of a data storage element 42 at the transport unit 26, or positioned to detect a data storage element 42 moving to and from the transport unit 26. A sensor may also be fixed at a location of a robotic data storage library 20 where, after a data storage element 42 is retrieved from a storage location 22 or a data transfer interface 44 by the transport unit 26, the transport unit 26 may move the data storage element 42 to the sensor to detect the presence and/or identity of the data storage element 42. One or more sensors may also be attached to a data storage element 42 that is capable of determining the location of the data storage element 42 at a transport unit 26 of the robotic data storage library 20 and/or identifying the data storage element 42 to the controller 28 of the robotic data storage library 20.

In another embodiment, one or more sensors may also be used to detect the presence and/or identity of a data storage element in other locations of a robotic data storage library 20.

One or more sensors may also detect the presence and/or identity of a transport unit 26 of the robotic data storage library 20. The sensor may, for example, be fixed in the robotic data storage library 20 or mounted on a movable component of the robotic data storage library 20. For example, sensor(s) may be mounted along a track on which a transport unit 26 travels within the robotic data storage library 20 to detect a position and/or identity of a transport unit 26. One or more sensors can also be attached to a transport unit 26 or an assembly for receiving a transport unit 26 for determining the location and/or identity of the transport unit 26 within the robotic data storage library 20.

One or more sensors may also detect the presence and/or identity of a data transfer interface 44 within the robotic data storage library 20. A sensor may, for example, be fixed in the robotic data storage library 20, mounted on a movable component of the robotic data storage library 20, or attached to a data transfer interface 44 that may be installed in the robotic data storage library 20 at a data transfer interface location 24. A sensor may be positioned in the robotic data storage library 20 to detect the presence and/or identity of a data transfer interface 44 at a data transfer interface location 24. For example, a sensor may be fixed at a data transfer interface location 24 to detect the presence and/or identity of a data transfer interface 44 at the data transfer interface location 24. A sensor may also be attached to a movable component of the robotic data storage library 20, such as the transport unit 26, to be able to detect the presence and/or identity of a data transfer interface 44 at a data transfer interface location 26. In one embodiment, for example, a sensor may be attached to a port for receiving a data transfer interface 44 at a data transfer interface location 24. The sensor may be attached to the port such that when a data transfer interface 44 is plugged into the port, the sensor detects the presence and/or identity of a data transfer interface.

The sensor system 32 may also comprise a plug-in, network or other connection by which the controller 28 can detect, query and/or receive information from an item that is connected. A data transfer interface 44 or a transport unit 26, for example, may include a connector for connecting to the controller 28. When the data transfer interface 44 or transport unit 26 is connected to the controller (or when the controller transitions from a power-off state to a power-on state), the controller 28 may detect the presence and/or identity of the data transfer interface 44 or the transport unit 26.

In another embodiment, the sensor system 32 may also utilize a data transfer interface to determine the presence of a data storage element 42 at a data transfer interface 44 and/or an identity of a data storage element 42 while it is at the data transfer interface (whether it is located at the data transfer interface or delivered to the data transfer interface for identification) by establishing a communication path between the data storage element 42 and a data transfer interface 44 and reading data from the data storage element 42 via the data transfer interface 44. For example, a data storage element 42 that is located via the sensor system 32, may be retrieved from a storage location 22 and delivered to a data transfer interface 44 to determine the identity of the data storage element 42 by reading data stored on a media of the data storage element 42.

The controller 28 may also control the sensor system to perform an audit of the robotic data storage library 20. An audit comprises checking locations of the robotic data storage library 20 for items and identifying items found in the locations of the robotic data storage library 20 checked. A location of the library that may be checked, for example, may include a location of the library capable of holding a data storage element 42, such as a storage location 22, a data transfer interface 44 and a transport unit 26. A location of the library that may be audited may also include a location that is capable of holding a data transfer interface 44, such as a data transfer interface location 24. Another location of the library 20 that may be audited is a transport unit location that receives a transport unit 26. A transport unit location, for example, may include an assembly to which a transport unit 26 may be attached. The various locations that are audited, for example, may comprise fixed locations or locations that are capable of being moved. A transport unit 26, for example, comprises at least one location capable of holding a data storage element 42 while the transport unit 26 is moving the data storage element 42 within the robotic data storage library 20.

An audit may be used to create an inventory or to verify an inventory for a robotic data storage library 20. An inventory comprises a list (or other variable format, such as an array or the like) that includes a presence/absence of an item at a particular location of the library 20 and, if an item is present at a location of the library, an identity of the item. An inventory of the robotic data storage library shown in FIG. 1, for example, may comprise a list data storage elements 42 located at storage locations 22, data transfer interface 44 and transport unit 26. The inventory may also comprise a list comprising a data transfer interface 44 located at data transfer interface location 24 and/or a transport unit 26 located at one or more transport unit locations. One skilled in the art would readily recognize, from this disclosure, that the locations listed here are merely illustrative and that an inventory may comprise entries corresponding to other locations of a robotic data storage library for which it would be desirable to monitor the contents.

In one embodiment, for example, an inventory may comprise an array of locations L(1) to L(x), where L(1) comprises a variable corresponding to a first location of the robotic data storage library 20 and L(x) comprises a variable corresponding to the last location of the library 20 to be included in the inventory. In a cartridge-based robotic data storage library, for example, an inventory may comprise an array of variables each corresponding to a location, such as a storage location, a drive and a robot, that is capable of holding a data cartridge in the library. The value of each variable in the array can identify whether a data cartridge is present in a particular location and, if so, identify the particular cartridge that is present in that location.

Several different types of audits are possible. A full audit, for example, may comprise an audit that comprises checking each location of interest of a robotic data storage library 20 regardless of whether each location is checked in a single audit step or in multiple steps that collectively check each location of interest. The locations of interest of the library may include all locations for which a library maintains an inventory or a subset of locations of the library, such as a group of locations for which the contents of the location are more likely to change (e.g., locations capable of holding a data storage element). A full media audit, for example, may be performed by auditing each location that is capable of holding a data storage element, for example. The full media audit may be performed by auditing a each location in a single audit step or by performing multiple audit steps that collectively audit each location of the library capable of holding a data storage element.

A partial audit comprises an audit of a subset of the locations that comprise a full audit. In one embodiment, for example, a partial audit may be used to sample a statistically significant number of locations to determine if it is likely that the inventory stored in nonvolatile memory 30 is accurate. In a magazine-based library, for example, the library comprises a plurality of storage locations capable of holding a magazine, which in turn comprises at least two storage locations capable of holding a data storage element. One type of partial audit that may be performed in a magazine-based library, for example, comprises a magazine audit. A magazine audit comprises auditing each magazine to compare if the magazines stored in the library match the identity of magazines identified in an inventory, while not auditing the individual data storage elements stored in storage locations of the magazines.

A mismatch audit is an audit that may be performed after a partial audit to update the inventory where a partial audit found a discrepancy between the status of the library 20 and the inventory stored in memory. In a mismatch audit, an audit is performed on locations where the partial audit found a discrepancy between the state of the library and the inventory stored in memory, while no audit is performed on locations for which the partial audit results matched the inventory. Where a magazine audit was performed in a magazine-based library, for example, a mismatch audit may comprise determining if the magazine audit found a discrepancy between the magazines stored in the library and the inventory stored in memory. If a discrepancy was found, the mismatch audit may be used to audit the data storage elements of the magazine(s) for which a discrepancy was found, but not check data storage elements in magazines for which the results of the magazine audit matched the inventory in memory.

An audit may also be performed off-line or in the background of other operations of a robotic data storage library 20. In an off-line audit of a robotic data storage library, for example, the library is taken off-line, i.e., out of control of the host, so that the host cannot access data in the library and/or store data to media in the library while the audit is being performed. During the off-line audit, the controller 28 controls the sensor system 32 to check one or more locations of the library and compare the contents of the one or more locations with the contents of the inventory corresponding to the one or more locations audited. After the audit is complete and the inventory is updated, the library may be placed into an operational state in which a host computer can read data from media in the library and/or write data to media in the library.

A background audit, however, is performed while a robotic data storage library is in an operational state, during which a host computer can read data from media in the library and/or write data to media in the library. The background audit, for example, may be performed during idle times when the library is not performing operations under control of a host computer. The audit need not be performed over a single idle time, but may be performed over multiple idle times spread across library operations being performed under the control of a host computer. During a background audit, therefore, a library is in an operational state in which it is also available to perform library operations under the control of a host computer.

FIG. 2 shows one embodiment of a method 51 for building an inventory of the library 20 and storing that inventory in a nonvolatile memory 30 where it can be used, as described below, during a later transition from a power-off state to a power-on state. The method 51, for example, may be performed under the control of software running on the controller 28, a host computer 50 or another computer in communication with the library 20.

In one embodiment, for example, when the library 20 is initially assembled and transitioned from a power-off state to a power-on state, the nonvolatile memory 30 may not contain an inventory for the library 20. After the library is transitioned from a power-off state to a power-on state, the controller 28 controls the sensor system 32 to perform an audit of the library 20 in operation 52. The perform audit operation 52 may comprise a full audit of the library to create a complete inventory of locations in the library 20 or may comprise a partial audit of the library if only a partial inventory is required. In one embodiment, for example, the nonvolatile memory 30 may comprise an inventory identifying certain items of the library 20 that are physically installed in the library 20, such as one or more transport units 26 and one or more data transfer interfaces 44. In this embodiment, for example, the perform audit operation 52 may perform an audit of data storage elements 42 that are present in the library 20 without determining whether another portion of the inventory is accurate.

The controller 28 causes an inventory to be built from the results of the audit in operation 54 and causes the inventory to be stored in memory in operation 56. The inventory may be built in operation 54 during the perform audit operation 52 or following the perform audit operation 52. The memory may comprise the nonvolatile memory 30 or may comprise a volatile memory if the contents of the volatile memory are stored in nonvolatile memory 30 prior to the removal of power to the volatile memory. After the inventory is built, the controller 28 causes the inventory to be transmitted to a host computer 50 in operation 58 and sets the library to an operational state in which the host computer 50 can write data to and/or read data from media in the library 20. During the operation of the library, data storage elements 42 may be moved within the library 20. The controller 28 monitors the operation of the library 20 in operation 60 and when a data storage element 42 is moved, updates the inventory in memory in operation 62. If the memory comprises a volatile memory, the controller causes the contents of the volatile memory to be stored in nonvolatile memory 30 prior to a transition to a power-off state.

FIGS. 3A through 9 show various methods of reducing the time required for a robotic data storage library 20 to reach an operational state after transitioning from a power-off state to a power-on state. These methods may be performed, for example, under the control of software running on the controller 28, a host computer 50 or another computer in communication with the library 20. For ease of discussion, the methods described below with reference to FIGS. 3A through 9 are described as being performed under the control of software running on the controller 28. One skilled in the art would readily recognize, based upon this disclosure, however, that the methods may alternatively be performed under the control of software running on a host computer 50 or on another computer in communication with the library 20.

Figure 3A:
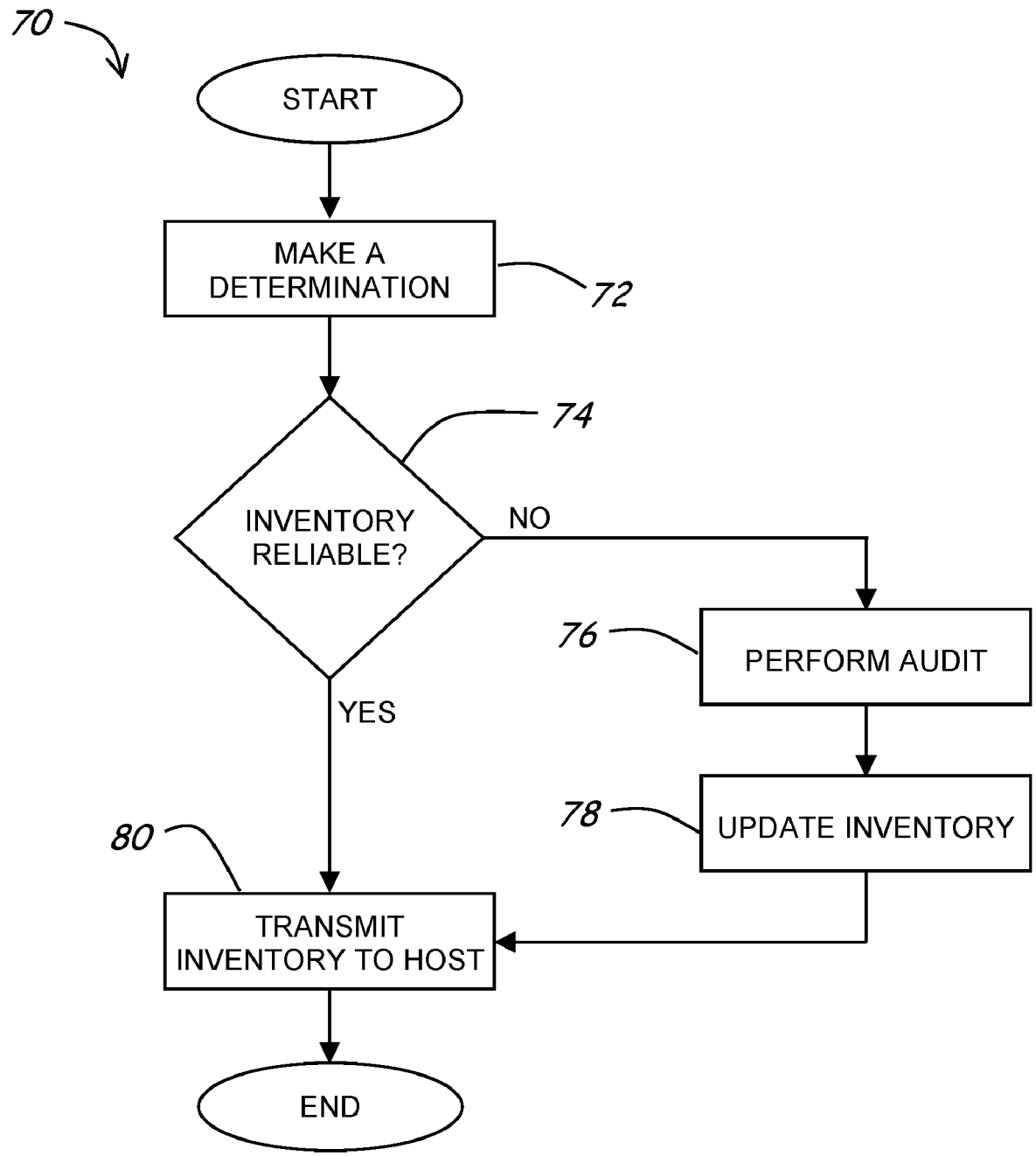
FIG. 3A shows a flow diagram of an embodiment of a method for reducing the transition time to reach an operational state of a robotic data storage library after a transition from a power-off state to a power-on state.

One method 70 of reducing the time required for a robotic data storage library 20 to reach an operational state after transitioning the library 20 from a power-off state to a power-on state is shown in FIG. 3A. In FIG. 3A, following a transition of the library 20 from a power-off state to a power-on state, the controller makes a determination about the reliability of the inventory stored in the nonvolatile memory 30 at operation 72. The controller may make a determination, for example, based on a query of an operator, a status of a reliability sensor and/or the result of a partial audit. In one embodiment, for example, the controller may query an operator to determine the reliability of the inventory stored in the nonvolatile memory 30. In this embodiment, the controller may query the operator via a user interface, such as an LCD touch screen. The query may, for example, ask whether any changes were made to the robotic data storage library 20 that would cause the inventory to be unreliable. The controller 28 may require an operator to answer the query before proceeding with the transition to an operational state or may time out if an operator does not answer the query within a predetermined period of time. If the operator does not answer the query, the controller 28 may make an assumption about the reliability of inventory from the lack of a response. The controller 28 may, for example, assume that an operator's failure to answer the query indicates that the inventory is reliable, or that an operator's failure to answer the query indicates that the inventory is unreliable.

The controller 28 may also make a determination relating to the reliability of the inventory stored in the nonvolatile memory 30 by checking a reliability sensor. A door or side panel of the library may include one or more reliability sensors, such as a non-resettable electro-mechanical lock that indicates whether the door or side panel of the library 20 has been opened or removed while the library 20 was in a power-off state. Other reliability sensors related to sensing a position of a door, a panel, a storage location 22, a transport unit 26 or a data transfer interface 44, for example, may be used to in the making a determination operation 72 to decide whether the inventory stored in the nonvolatile memory is reliable or unreliable.

The controller 28 may also make a determination relating to the reliability of the inventory stored in nonvolatile memory 30 by controlling the sensor system 32 to perform a partial audit of the library 20 and comparing the result of that partial audit to the corresponding portion of the inventory stored in the nonvolatile memory. If a partial audit is performed of a portion of locations of the library 20, for example, the controller may determine whether the result of that partial audit is consistent with the corresponding portion of the inventory stored in the nonvolatile memory 30. If the result of the partial audit is consistent with the corresponding portion of the inventory, the controller 28 may make a determination that the inventory stored in nonvolatile memory is reliable. If the result of the partial audit, however, is inconsistent with the corresponding portion of the inventory stored in nonvolatile memory, the controller 28, may make a determination that the stored inventory is unreliable.

In operation 74, the controller checks to see whether the determination of operation 72 was that the stored inventory is reliable or whether the stored inventory is unreliable. If the stored inventory was determined to be unreliable, the controller causes the perform audit operation 76 to be performed and updates the stored inventory in operation 78 from the results of the audit performed in operation 76. The audit performed in operation 76, for example, may comprise a full or a partial audit of the library. In the embodiment in which a partial audit of the library is performed in operation 76, the partial audit preferably checks the locations of the library 20 corresponding to a portion of the stored inventory that may have been determined to be unreliable in operation 72. After the inventory stored in nonvolatile memory is updated, the controller proceeds to operation 80. Alternatively, if the determination made in operation 72 indicated that the stored inventory was reliable, the controller proceeds to operation 80, where the controller 28 causes the stored inventory to be transmitted to a host computer 50 and sets the state of the library to an operational state.

Figure 3B:
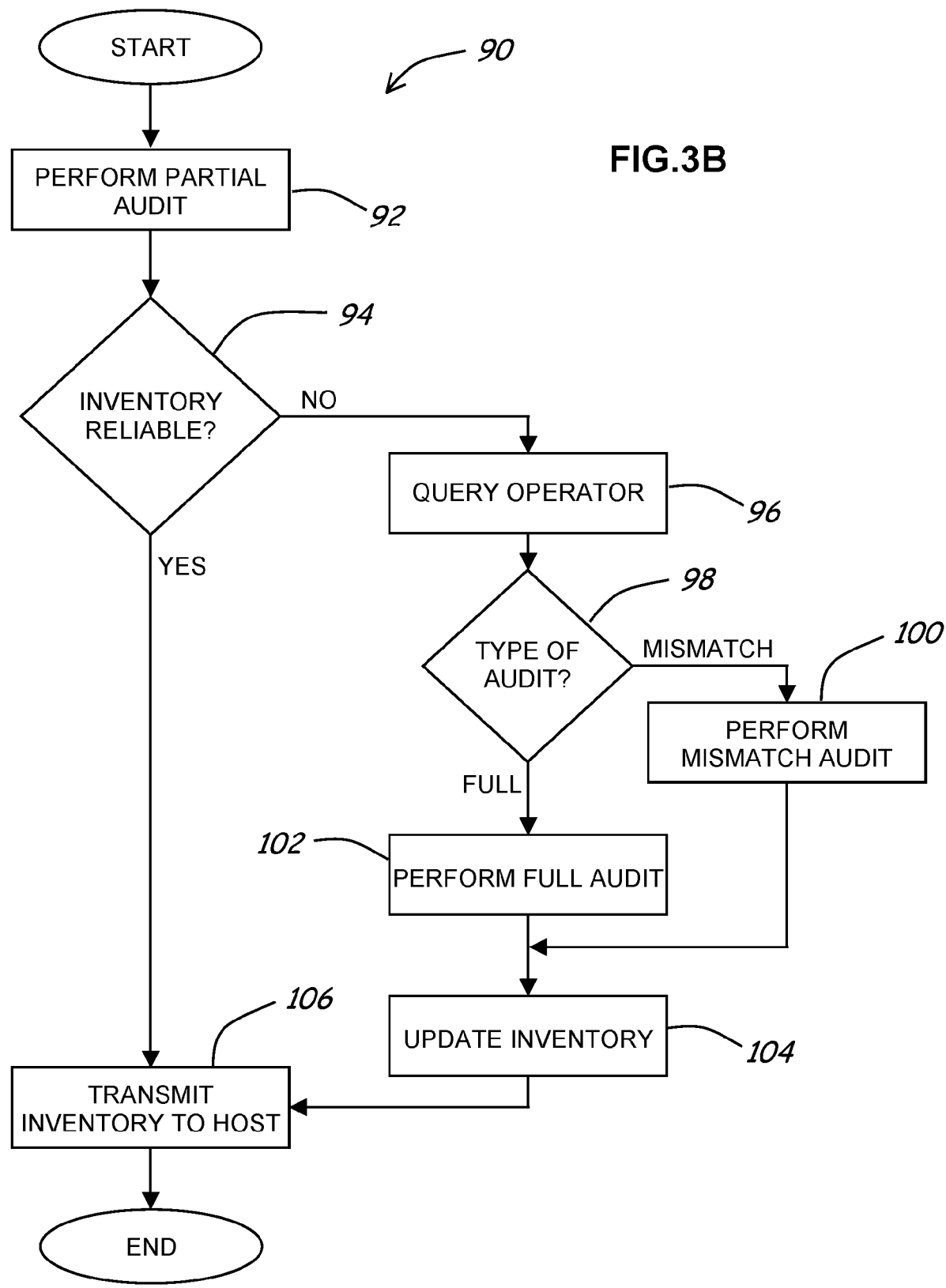
FIG. 3B shows a flow diagram of a second embodiment of a method for reducing the transition time to reach an operational state of a robotic data storage library after a transition from a power-off state to a power-on state.

FIG. 3B shows an alternative method 90 of reducing the time required for a robotic data storage library 20 to reach an operational state after transitioning the library 20 from a power-off state to a power-on state to the method 70 shown in FIG. 3A. In FIG. 3B, the controller 28 causes the sensor system 32 to perform a partial audit of the library 20 in operation 92. The controller then compares the results of the partial audit to a corresponding portion of the inventory stored in nonvolatile memory in operation 94 to determine if the stored inventory is reliable or unreliable as described above with respect to FIG. 3A. If the controller 28 determines that the stored inventory is unreliable based upon the results of the partial audit conducted in operation 92, the controller branches to operation 96 in which the controller queries an operator to determine whether the controller should cause a full audit or a mismatch audit to be performed by the sensor system 32. If the operator selects a mismatch audit in operation 96, the controller 28 branches in operation 98 to operation 100 where a mismatch audit is performed under the control of the controller 28. If the operator selects a full audit, however, the controller branches to operation 102 where a full audit is performed under the control of the controller 28. Regardless of whether a mismatch audit or a full audit is performed, the controller updates the stored inventory based upon the results of the audit performed in operation 104. After the inventory is updated in operation 104, the controller 28 proceeds to operation 106. If the controller 28 determines that the stored inventory is reliable in operation 94 based upon the results of the partial audit performed in operation 92, the controller 28 proceeds directly to operation 106, in which the controller 28 causes the stored inventory to be transmitted to a host computer 50 and sets the state of the library to an operational state.

FIG. 4 shows another embodiment of a method 110 of reducing the time required for a robotic data storage library 20 to reach an operational state after transitioning the library 20 from a power-off state to a power-on state to the methods shown in FIGS. 3A and 3B. In FIG. 4, after the library 20 is transitioned from a power-off state to a power-on state, the controller 28 causes the inventory stored in nonvolatile memory 30 to be transmitted to a host computer 50 in operation 112 and sets the state of the library 20 to an operational state. The controller then causes the sensor system 32 to perform a background audit of the library in operation 116. The controller 28 also makes a determination about the reliability of the stored inventory by comparing the results of the background audit performed in operation 116 to a corresponding portion of the inventory stored in nonvolatile memory 30 in operation 118. If the inventory is determined to be unreliable in operation 118, the controller branches to operation 120 in which the inventory is updated. The inventory may be updated in operation 120 during the perform background audit operation 116 or following the perform background audit operation 116. The controller causes an error message to be transmitted to a host computer 50 in operation 122. The controller 28 causes the updated inventory to be transmitted to the host computer 50 in operation 126. If the background audit performed in operation 116 indicates that the stored inventory is reliable in operation 118, however, the controller continues operation of the library in an operational state as shown in FIG. 4.

In one embodiment of a library 20 performing the method illustrated in FIG. 4, for example, the library 20 may utilize available command sets for communicating with a host computer 50. Command sets (e.g., SCSI or fiber channel command sets) for communicating between the library 20 and the host computer 50, for example, typically comprise reserved commands for informing the host computer that the door of the library is open or closed. When a host computer receives a door open command followed by a door closed command, the host typically requests an updated inventory from the library 20 because data storage element(s) in the library 20 may have been added to, moved in, or removed from the library 20. In one embodiment of a library 20, these commands are available for use to inform a host computer to request an updated inventory where the stored inventory of a library 20 has been updated during an operational state such as shown in FIG. 4. After updating the stored inventory based upon the results of the background audit, the controller 28 may, for example, issue an open door command followed by a close door command to a host computer 50. In response, the host computer issues a request for a new inventory and the controller can cause the updated inventory to be transmitted to the host computer in response.

Figure 5:
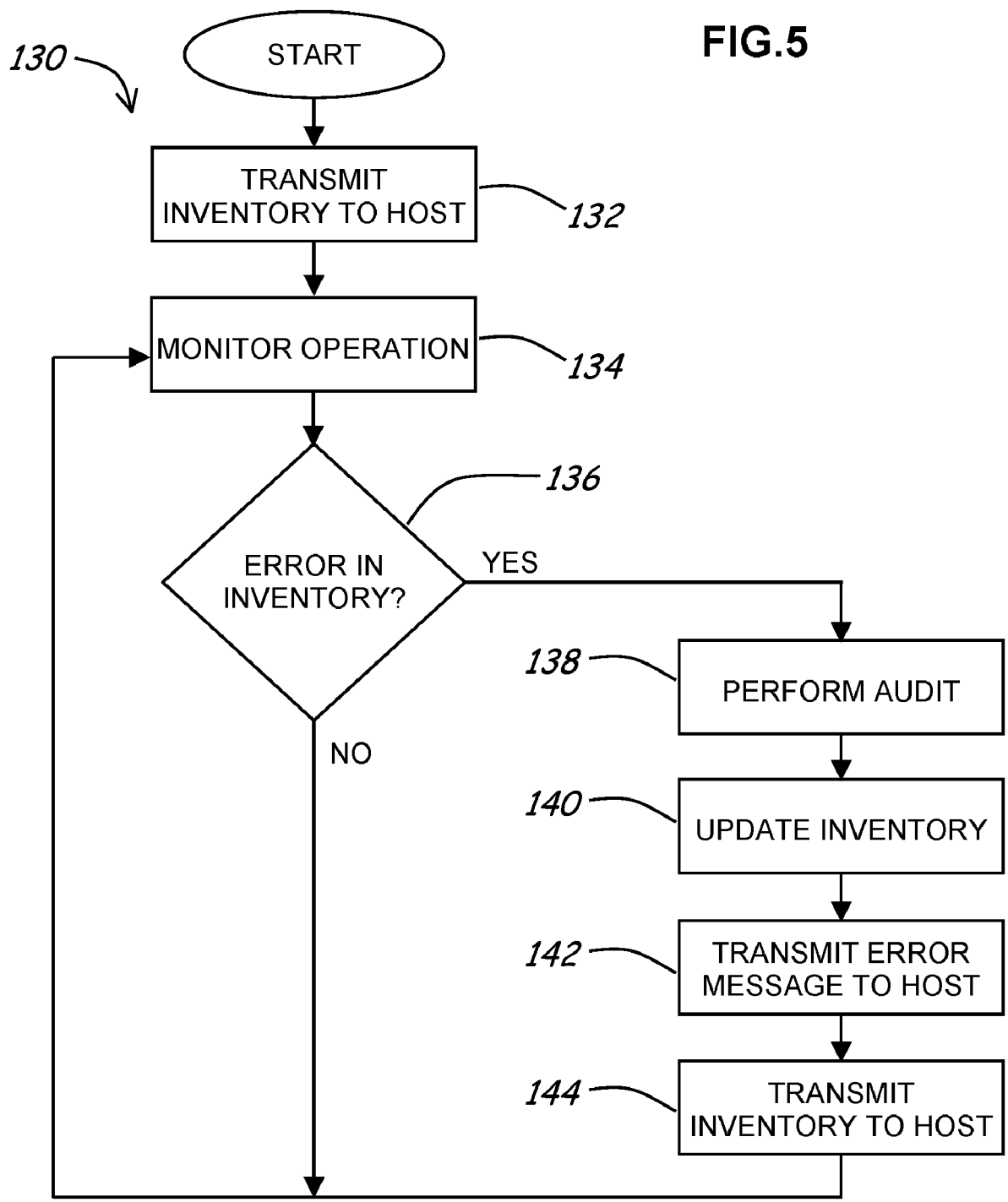
FIG. 5 shows a flow diagram of a fourth embodiment of a method for reducing the transition time to reach an operational state of a robotic data storage library after a transition from a power-off state to a power-on state.

FIG. 5 shows yet another embodiment of a method 130 of reducing the time required to reach an operational state after transitioning a robotic data storage library from a power-off state to a power-on state to the methods shown in FIGS. 3A, 3B and 4. In FIG. 5, after the library 20 is transitioned from a power-off state to a power-on state, the controller 28 causes the inventory stored in nonvolatile memory 30 to be transmitted to a host computer 50 in operation 132 and sets the state of the library 20 to an operational state. The controller then monitors the operation of the library 20 while it is in the operational state in operation 134. The controller 28 compares the results of the operation of the library with the corresponding portion of the inventory stored in memory in operation 136. If the controller finds a discrepancy during operation of the library between what is detected, such as by using the sensor system 32, and what is stored in a corresponding portion of the stored inventory in operation 136, the controller 28 branches to operation 138. At operation 138, the controller causes an audit to be performed. The audit performed in operation 138 may comprise a full audit or may comprise a mismatch audit. A mismatch audit, for example, may audit the portion of the locations of the library 20 for which the controller detected a discrepancy between the actual contents of the locations and the corresponding portions of the stored inventory.

The audit may also be performed as a background audit or as an off-line audit. A background audit, as described above, allows the library to be maintained in an operational state and to continue to perform under the control of a host computer 50. In an off-line audit, however, the controller transitions the state of the library out of an operational state and discontinues the operation of the library 20 under the control of a host computer 50 while the audit is being performed.

Regardless of whether the audit is performed as a background audit or an off-line audit, the controller 28 updates the inventory from the results of the audit in operation 140. The controller 28 also transmits a message to the host indicating that the inventory has been updated in operation 142. As described above, the controller 28 may use commands reserved for the door open and door closed to cause the host computer 50 to request an updated inventory. The controller 28 also causes the updated inventory to be transmitted to the host computer 50 in operation 144. The inventory may be transmitted to the host computer 50 at the initiative of the controller 28 or in response to a request from the host computer 50. If the audit was performed as an off-line audit, the controller 28 will also reset the state of the library 20 to an operational state and allow the host computer 50 to resume control over the operation of the library 20.

If the controller 28 does not detect a discrepancy between what is detected during operation and what is stored in a corresponding portion of the stored inventory in operation 136, the controller 28 continues to monitor the operation of the library as shown in FIG. 5.

One particular type of robotic data storage library comprises a magazine-based library in which a moveable magazine contains at least two storage locations for holding a data storage element and in which the magazine is moved to and from a storage location. In a magazine-based library, for example, an audit may detect (1) the location and identity of magazines located in storage locations of the library, and (2) the location and identity of data storage elements located within magazines.

Figure 6A:
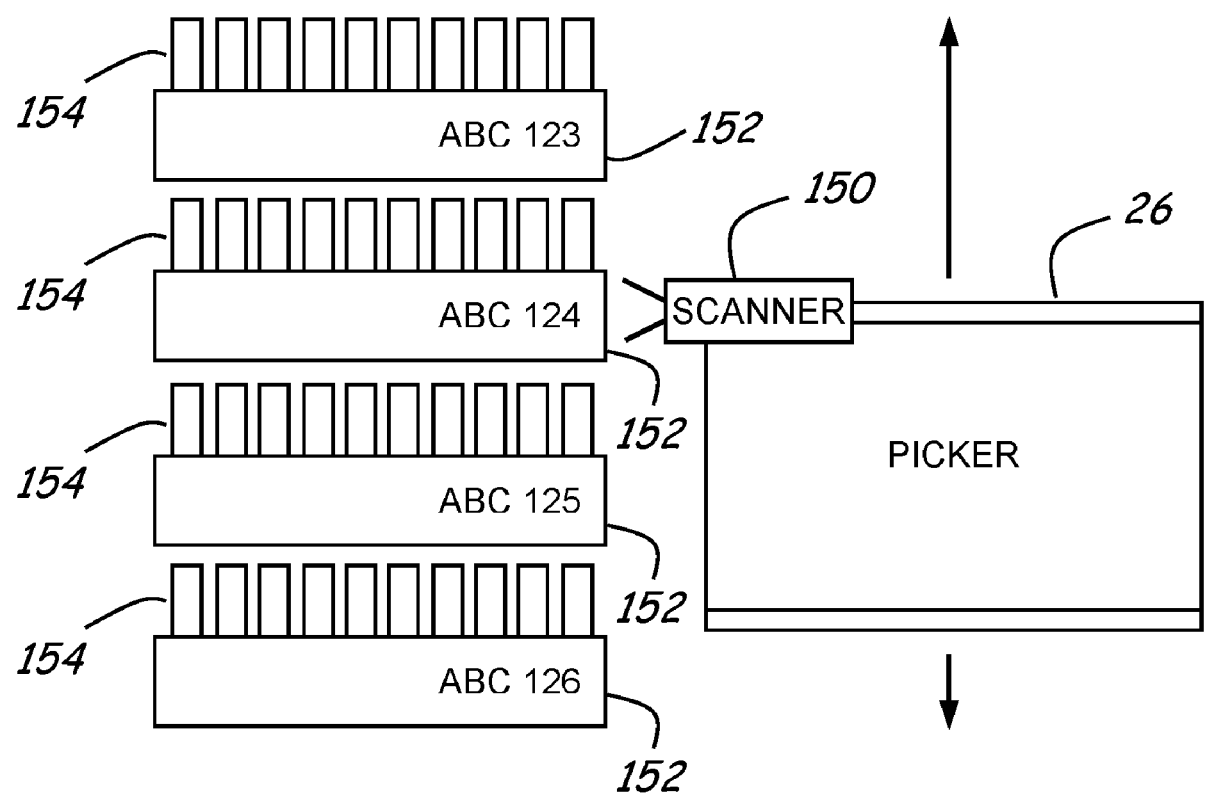
FIG. 6A shows a block diagram of a magazine audit operation of a robotic data storage library.

In FIG. 6A, for example, a magazine audit is shown in which a transport unit 26 comprising a sensor 150, such as a scanner, is used to scan the magazines 152 without scanning the contents 154 of the magazines. A magazine audit, as described above, is one example of a partial audit that may be performed in a magazine-based library. A controller 28 can thus use a magazine audit to determine if there is a discrepancy between the location and/or identity of a magazine within a magazine based library and the corresponding portion of the inventory stored in the nonvolatile memory 30.

Figure 6B:
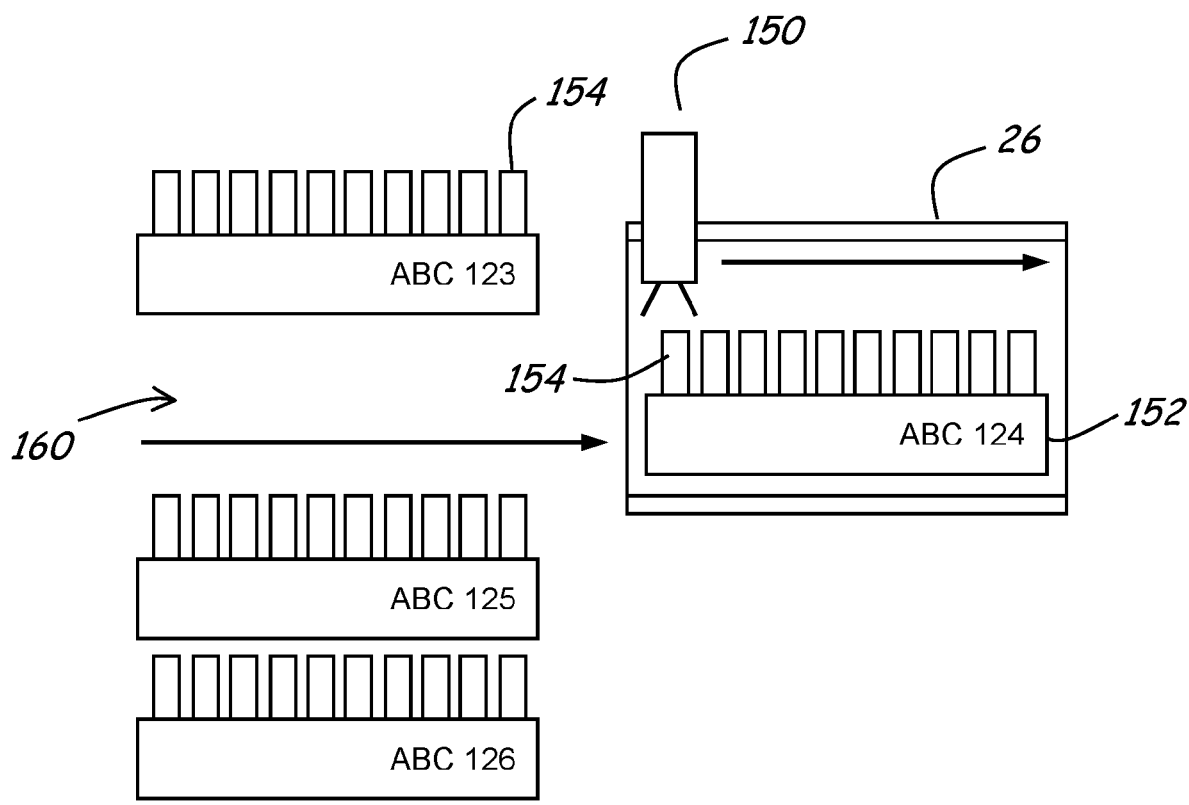
FIG. 6B shows a block diagram of an audit operation for auditing the contents of a magazine.

FIG. 6B shows an alternative partial audit that may be performed in a magazine-based library. In the partial audit shown in FIG. 6B, the partial audit comprises scanning the contents of one or more magazines 152 to determine the location and identity of data storage elements 154 within the magazine(s). In this embodiment, a magazine 152 is removed from a storage unit 160 by a transport unit 26. A scanner 150 mounted on the transport unit is used to scan the contents of the magazine to determine the location and identity of data storage elements 154 within the magazine 152.

Figure 7:
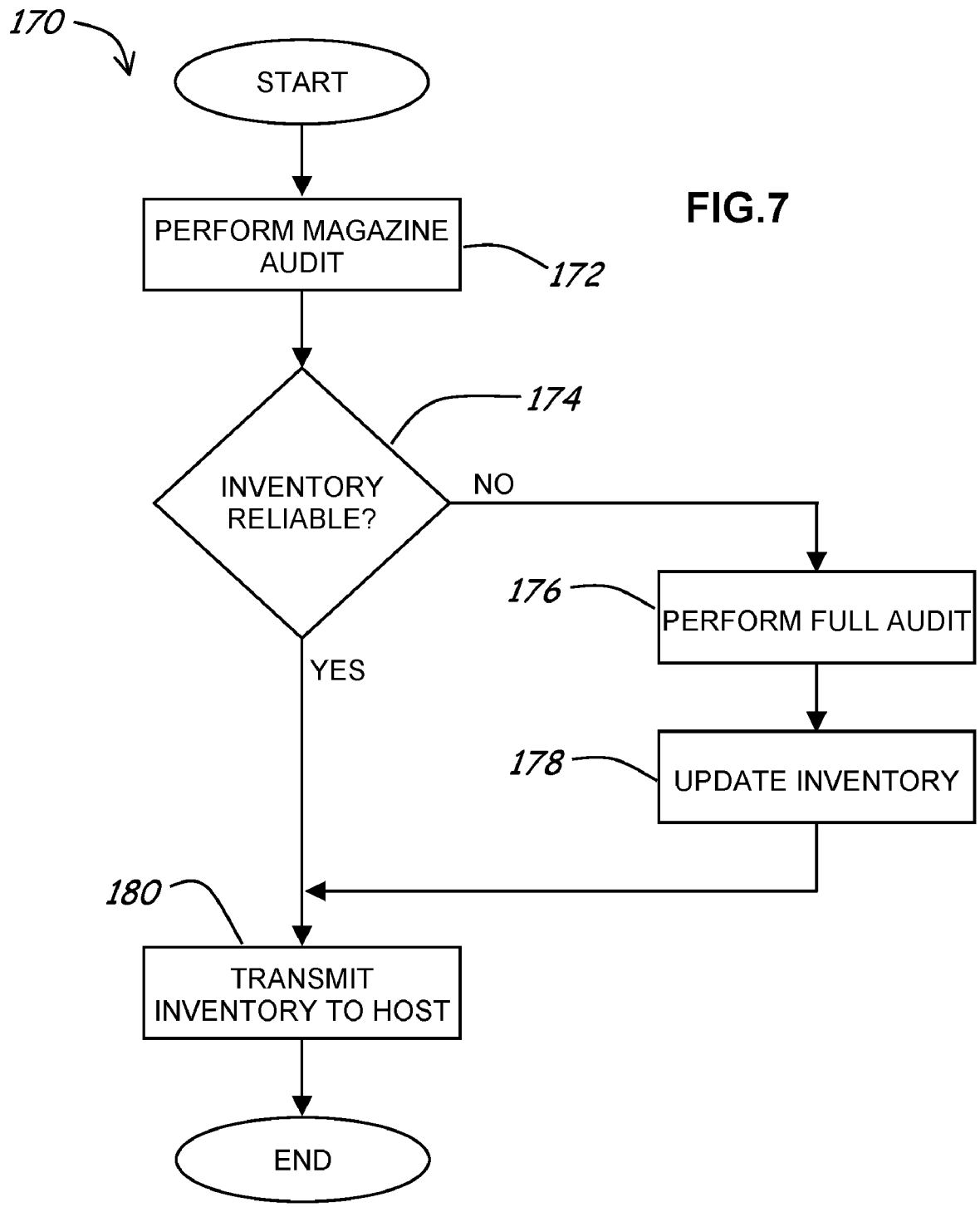
FIG. 7 shows a flow diagram of an embodiment of a method for reducing the transition time to reach an operational state of a magazine-based robotic data storage library after a transition from a power-off state to a power-on state.

FIG. 7 shows an embodiment of a method 170 of reducing the time required to reach an operational state after transitioning a magazine-based robotic data storage library from a power-off state to a power-on state. In FIG. 7, after the magazine-based library is transitioned from a power-off state to a power-on state, the controller 28 causes a magazine audit to be performed in operation 172. Thus, the identity and location of one or more magazines at the storage locations are detected, but the controller 28 preferably does not audit the contents of the magazine(s) themselves. In operation 174, the controller 28 determines whether the results of the magazine audit indicate whether the stored inventory is reliable or unreliable as described above with reference to FIGS. 3A and 3B. If the controller 28 determines that the results of the magazine audit indicate that the stored inventory is unreliable, the controller 28 branches to operation 176 to cause a full audit to be performed. The controller 28 also causes the inventory to be updated from the results of the magazine audit performed in operation 172 and/or the full audit performed in operation 176. After updating the inventory in operation 178, the controller 28 proceeds to operation 180, where the controller causes the updated inventory to be transmitted to a host computer 50. While FIG. 7 shows a full audit being performed in operation 176, the full audit need not duplicate the magazine audit performed in operation 172. As described above, a full audit may comprise two or more partial audits that collectively audit each location of interest for the full audit. Thus, if the magazine audit performed in operation 172 comprised auditing each of the storage locations capable of holding a magazine, the full audit performed in operation 176 may comprise a combination of the magazine audit and a second partial audit performed at operation 176 that audits each of the storage locations 160 (see FIGS. 6A and 6B) of the magazines present in the magazine-based library that are capable of holding a data storage element. Further, the controller may combine the results of operations 172 and 176 to update the stored inventory in operation 178.

If the controller determines that the results of the magazine audit comprised an indication of reliability of the inventory stored in nonvolatile memory at operation 174, the controller jumps to operation 180 and causes the stored inventory to be transmitted to a host computer 50.

Figure 8:
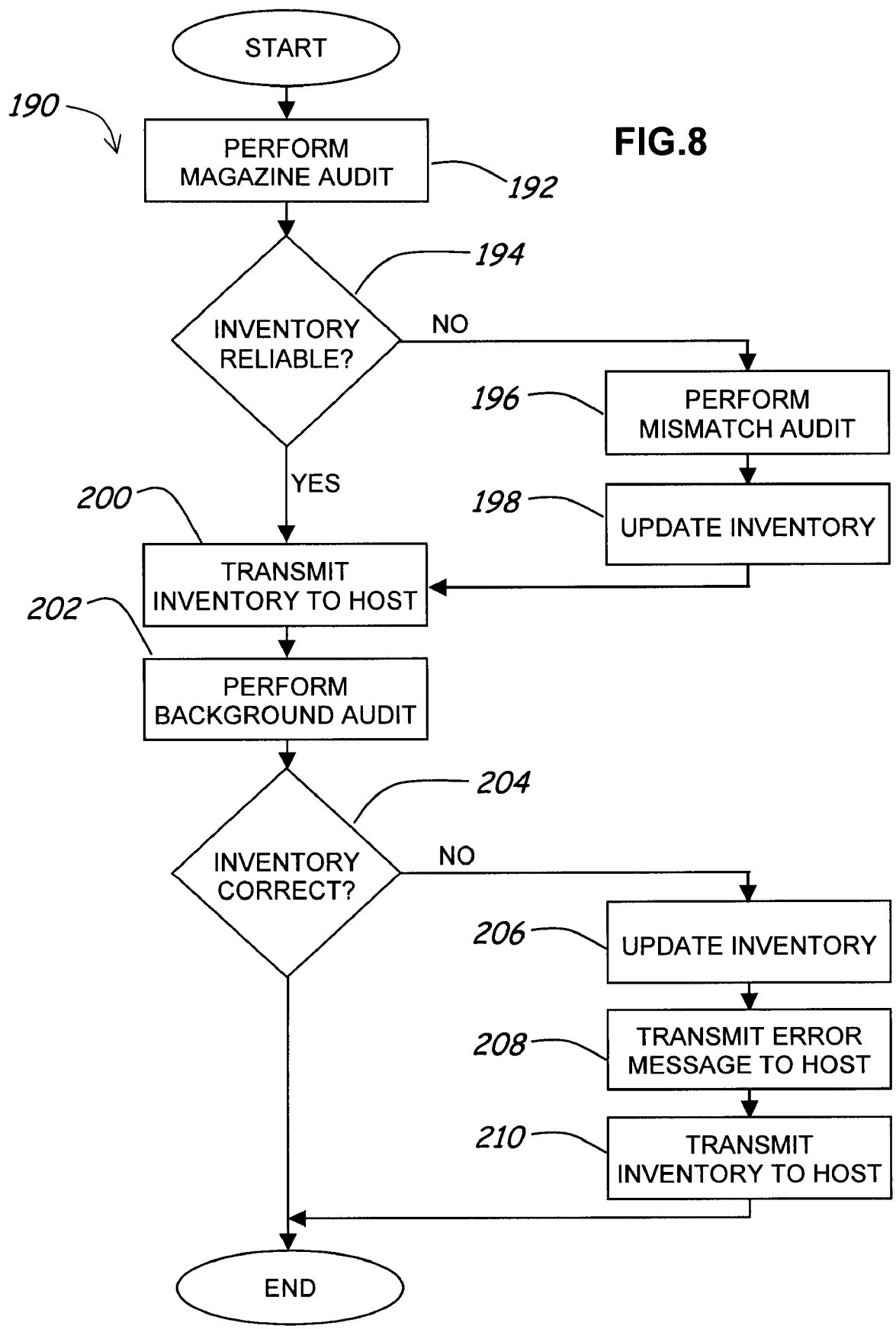
FIG. 8 shows a flow diagram of a second embodiment of a method for reducing the transition time to reach an operational state of a magazine-based robotic data storage library after a transition from a power-off state to a power-on state.

FIG. 8 shows another embodiment of a method 190 of reducing the time required to reach an operational state after transitioning a magazine-based robotic data storage library from a power-off state to a power-on state. In FIG. 8, after the magazine-based library is transitioned from a power-off state to a power-on state, the controller 28 causes a magazine audit to be performed in operation 192 as described above with respect to FIG. 7. The controller 28 also determines whether the result of the magazine audit comprises an indication of reliability or an indication of unreliability of the inventory stored in nonvolatile memory 30 at operation 194. If the controller determines that the result of the magazine audit of operation 192 comprises an indication of unreliability of the stored inventory, the controller 28 performs a mismatch audit at operation 196. As described above, a mismatch audit checks the locations of the magazine-based library where the magazine audit of operation 192 found a discrepancy between the status of the magazine-based library and the stored inventory. Thus, where the magazine audit of operation 192 finds a discrepancy between a location and/or identity of a magazine located in a storage location of the library, the mismatch audit of operation 196 can audit the contents of a magazine to determine the location and identity of data storage elements within that magazine.

In the method shown in FIG. 8, for example, the magazine audit may scan each of the storage locations of the magazine-based library capable of holding a magazine. The scan can determine the location and identity of any magazine found in the magazine audit and compare these results with a corresponding portion of the inventory stored in memory. Where the scan detects a magazine in a storage location 22 for which the inventory stored in memory indicates that there was no magazine, the controller may create a new magazine data structure and mark the magazine contents as invalid. Where a magazine is detected in a storage location for which the code does not match the code of a magazine saved in the inventory, the controller 28 may mark the magazine contents as invalid. Where a storage location 22 is found empty for which the inventory indicates a magazine is present, the controller 28 can delete the magazine data structure. Where the scan detects a magazine in a storage location 22 for which the code of the magazine matches the code saved in the stored inventory for that storage location 22, the controller can mark the magazine contents as valid.

After the magazine audit, the controller 28 can determine if any of the magazines found in the magazine audit had the magazine contents marked as invalid. If so, the controller 28 can perform a mismatch audit on any of the magazines that had its contents marked as invalid to determine the contents of those magazine(s).

After the mismatch audit is performed in operation 196 and the inventory in memory is updated in operation 198, the controller proceeds to operation 200. Also, if the controller 28 determines that the results of the magazine audit performed in operation 192 comprise an indication of the reliability of the stored inventory in operation 194, the controller 28 jumps to operation 200. In operation 200, the controller 28 causes the inventory stored in memory to be transmitted to a host computer 50 in operation 200. The controller 28 also sets the state of the magazine-based library to an operational state. The controller further initiates a background audit in operation 202. The background audit, for example, may comprise a full audit that checks the remainder of the locations of the magazine-based library that were not checked by the magazine audit or the mismatch audit (e.g., contents of magazines for which the location and identity of the magazine matched the corresponding portion of the inventory stored in memory). The controller 28 determines whether the inventory transmitted to the host computer 50 in operation 200 is correct in operation 204. If the controller 28 determines that the inventory transmitted to the host computer 50 in operation 200 is incorrect, the controller 28 causes the inventory stored in memory to be updated in operation 206, causes a message to be transmitted to a host computer 50 in operation 208, and causes the updated inventory of operation 206 to be transmitted to the host computer 50 in operation 210. If the controller 28 determines that the inventory transmitted to the host computer 50 in operation 200 is correct, however, the magazine-based library continues its normal operation.

Figure 9:
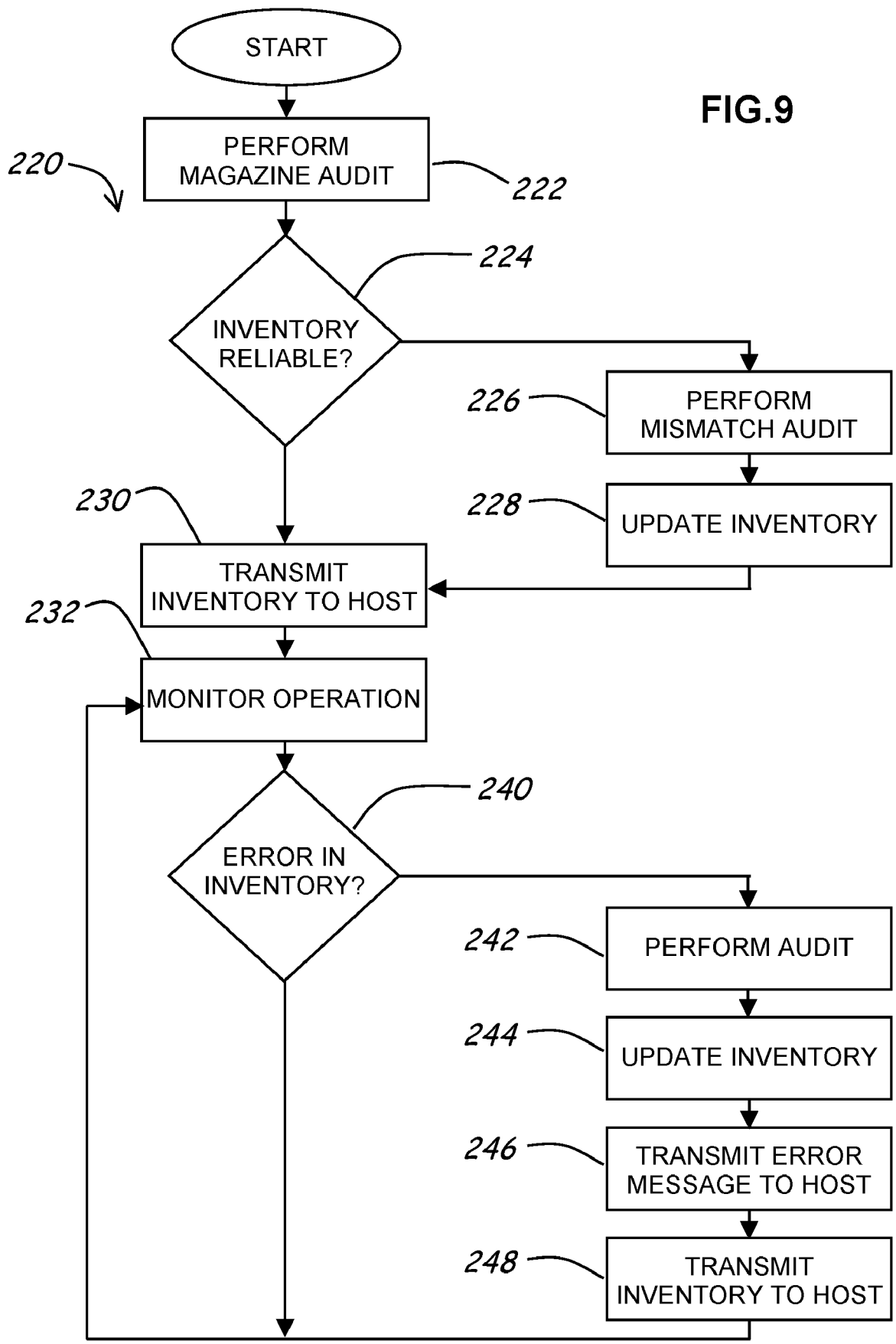
FIG. 9 shows a flow diagram of a third embodiment of a method for reducing the transition time to reach an operational state of a magazine-based robotic data storage library after a transition from a power-off state to a power-on state.

FIG. 9 shows another embodiment of a method 220 of reducing the time required to reach an operational state after transitioning a magazine-based robotic data storage library from a power-off state to a power-on state. In FIG. 9, after the magazine-based library is transitioned from a power-off state to a power-on state, the controller 28 causes a magazine audit to be performed in operation 222 as described above with respect to FIGS. 7 and 8. The controller 28 also determines whether the result of the magazine audit comprises an indication of reliability or an indication of unreliability of the inventory stored in memory at operation 224. If the controller determines that the result of the magazine audit of operation 222 comprises an indication of unreliability of the stored inventory, the controller 28 performs a mismatch audit at operation 226. After the mismatch audit is performed in operation 226 and the inventory in memory is updated in operation 228, and the controller proceeds to operation 230. Also, if the controller 28 determines that the results of the magazine audit performed in operation 222 comprise an indication of the reliability of the stored inventory the controller 28 jumps to operation 230, where the controller 28 causes the inventory stored in memory to be transmitted to a host computer. The controller 28 also sets the state of the magazine-based library to an operational state.

After the magazine-based library transitions to an operational state, the controller 28 monitors the operation of the library in operation 232 as described above with respect to FIG. 5. The controller 28 compares the results of the operation of the magazine-based library with the corresponding portion of the inventory stored in memory. If the controller 28 finds a discrepancy during operation of the library between what is detected, such as by using the sensor system 32, and what is stored in a corresponding portion of the stored inventory in operation 240, the controller 28 branches to operation 242 and causes an audit to be performed. As described above, with respect to FIG. 5, the audit performed in operation 242 may comprise a full audit, a mismatch audit, an off-line audit and/or a background audit.

The controller 28 updates the inventory from the results of the audit in operation 244. The controller 28 also transmits a message to the host indicating that the inventory has been updated in operation 246. As described above, the controller 28 may use commands, such as the SCSI commands reserved for a door open and door closed, to cause the host computer 50 to request an updated inventory. The controller 28 also causes the updated inventory to be transmitted to the host computer 50 in operation 248. The inventory may be transmitted to the host computer 50 at the initiative of the controller 28 or in response to a request from the host computer 50. If the audit was performed as an off-line audit, the controller 28 will also reset the state of the library 20 to an operational state and allow the host computer 50 to resume control over the operation of the library 20.

If the controller 28 does not detect a discrepancy between what is detected during operation and what is stored in a corresponding portion of the stored inventory in operation 240, the controller 28 continues to monitor the operation of the library.

Figure 10:
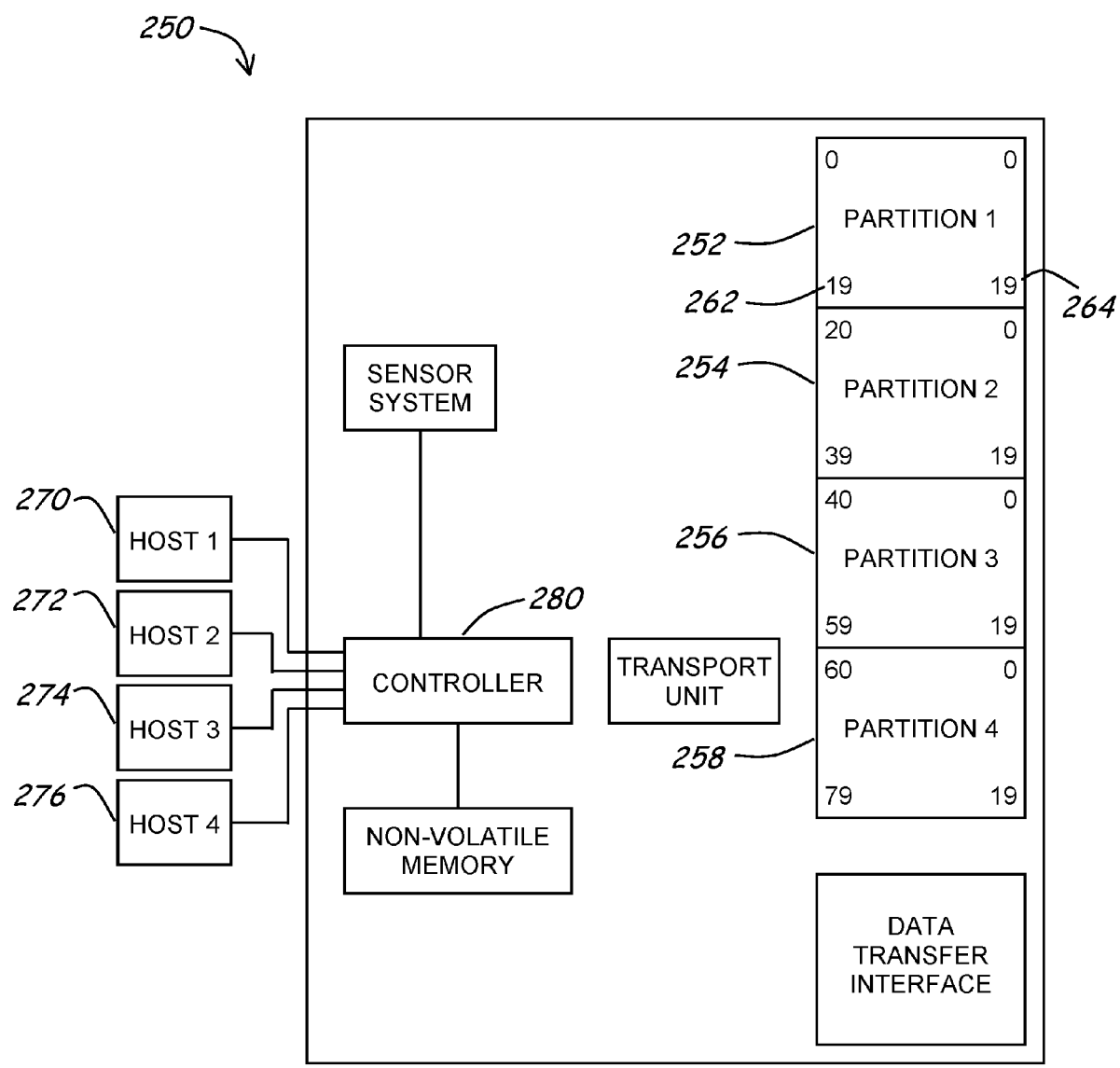
FIG. 10 shows a block diagram of a robotic data storage library comprising a plurality of partitions of storage locations and having the ability to reduce the transition time to reach an operational state after a transition from a power-off state to a power-on state.

FIG. 10 shows an embodiment of a robotic data storage library 250 in which the storage locations of the library are divided into partitions 252, 254, 256 and 258. Each of the partitions comprises a physical address 262 and a logical address 264. The host computers 270, 272, 274 and 276 can access each partition as an independent robotic data storage library by their logical addresses through the controller 280. The controller can audit each partition individually or collectively. If the controller 280 audits the partitions independently, for example, if one partition is undergoing an off-line audit, the remaining partitions may remain in an operational state.

While the invention has been particularly shown and described with reference to a preferred embodiment thereof, it will be understood by those skilled in the art that various other changes in the form and details may be made without departing from the spirit and scope of the invention.

The invention claimed is:

1. A robotic data storage library for operation with at least one data storage element and with the ability to reduce an amount of time to reach an operational state after a transition of the library from a power-off state to a power-on state, the robotic data storage library comprising: a plurality of storage locations, each capable of holding at least one of said data storage element; a data transfer interface for receiving one of said data storage elements and establishing a communication path with said data storage element so that data can be transferred between the data storage element and a host computer; a transport unit for moving one of said data storage elements between one of said plurality of storage locations and said data transfer interface; a nonvolatile memory for storing an inventory of locations of the robotic data storage library; a means for causing an audit to be performed to create an inventory, causing said inventory to be stored in said nonvolatile memory prior to said transition, and causing said inventory to be transmitted to the host computer after said transition.

2. The library of claim 1 wherein said plurality of storage locations comprises at least one location further capable of holding a magazine; said transport unit is adapted to move said magazine to and from said location; and said means for causing said audit to be performed to create said inventory comprises means for creating an inventory of locations capable of holding said magazine.

3. The library of claim 2 wherein said means for causing said audit to be performed to create said inventory comprises means for creating an inventory of locations each capable of holding one of said magazines and an inventory of locations capable of holding all other of said data storage elements.

4. The library of claim 1 wherein said data transfer interface comprises a port for receiving a drive pack and establishing a communication path with said drive pack so that data can be transferred between the drive pack and said host computer; said plurality of storage locations comprises a location capable of holding said drive pack; said transport unit is adapted to move said drive pack between said location and said port; and said means for causing said audit to be performed to create said inventory comprises means for creating an different inventory of locations capable of holding said drive pack.

5. A method for reducing the transition time required to reach an operational state of a robotic data storage library after a switching the library from a power-off state to a power-on state, the method comprising: providing said robotic data storage library comprising: a plurality of storage locations, each capable of holding at least one data storage element, a data transfer interface for receiving one of said data storage elements and establishing a communication path with one of said data storage elements so that data can be transferred between the data storage element and a host computer, and a transport unit for moving one of said data storage elements between one of said plurality of storage locations and said data transfer interface; auditing said robotic data storage library to create an inventory of locations of said robotic data storage library; storing said inventory of said robotic data storage library in a nonvolatile memory prior to said transition; transitioning said robotic data storage library from a power-off state to a power-on state; transmitting, following said step of transitioning, said inventory to the host computer.

6. The method, as claimed in claim 5, wherein, following said step of transitioning, monitoring operation of said robotic data storage library and said inventory for an error in said inventory, and, if said error is found, performing an audit.

7. The method, as claimed in claim 6, wherein said step of performing an audit comprises performing a background audit to update said inventory.

8. The method, as claimed in claim 6, wherein said step of performing an audit comprises performing an off-line audit to update said inventory.

9. The method, as claimed in claim 5, wherein, following said transport unit moving one of said data storage elements, updating said inventory in said nonvolatile memory.

10. A robotic data storage library comprising:

a plurality of data storage elements each disposed in one of a plurality of accommodating storage locations wherein each of said data storage elements is adapted to cooperate with a compatible data transfer interface;

said data transfer interface capable of receiving data from a host for storage on said cooperating data storage element;

a transfer unit for moving each of said data storage elements between one of said storage locations and said data transfer interface;

a controller prior to a power transition from a power-off state to a power-on state is capable of causing an audit to be performed to create an inventory of at least where said storage elements are located within said library and in response to sensing said power transition, said controller causing transmission of said inventory to said host; and nonvolatile memory for storing said inventory.

11. The library of claim 10, wherein at least one of said plurality of data storage elements is selected from one of the group consisting of: a tape, a tape cartridge, a tape magazine, a disk, a disk cartridge, a disk pack, a disk drive, a disk drive pack, a memory stick and a memory card.

12. The library of claim 10, wherein said plurality of data storage elements are disc drives that cooperate with said data transfer interface via a port for receiving said drive.

13. The library of claim 10, wherein said plurality of data storage elements are tape cartridges each capable of cooperating with said data transfer interface, said interface comprises a drive for receiving said cartridge.

14. The library of claim 10 wherein said plurality of data storage elements comprise a first type of storage element and a second type of storage element wherein said first and second types of storage elements are adapted to respectively cooperate with a first and second compatible data transfer interface.

15. The library of claim 14 wherein said inventory includes both said first type and second type of storage elements.

16. The library of claim 14 wherein said first type of storage element is a disk drive pack and said second type of storage element is a tape magazine.

17. The library of claim 16, wherein said data first compatible transfer interface is adapted to cooperate with said drive pack when said drive pack is at least partially inserted in a receiving port associated with said data transfer interface wherein said transfer interface establishes a communication path between said drive pack and said host computer.

18. The method of claim 16 wherein further comprising updating said inventory in said nonvolatile memory, following said transport unit moving one of said data storage elements.

19. The method of claim 16 wherein said inventory further comprises an accounting of all storage location not acommodating one of said data storage elements.

20. The method of claim 16 wherein said inventory further comprises an accounting of said data transfer interfaces.

21. A method for improving time to reach an operational state of a robotic data storage library when turned on, the method comprising:

transitioning said library from a power-off state to a power-on state, wherein said library comprises a transfer unit for moving one of a plurality of data storage elements between an accommodating storage location and a data transfer interface;

auditing said library to create an inventory of said storage locations that are accommodating one of said data storage elements prior to said transition;

storing said inventory in a nonvolatile memory prior to said transition;

transmitting said inventory to a host computer after said transition.

22. The method of claim 21 wherein said inventory can include storage locations not accommodating a data storage element.

23. The method of claim 21 further comprising determining if said inventory was stored accurately in said nonvolatile memory after said transition.

24. The method of claim 23 wherein said transmitting step is only performed upon determining that said inventory was stored accurately in said nonvolatile memory after said transition.

25. The method of claim 23 wherein said determining step comprises querying an operator.

26. The method of claim 25 wherein said transmitting step is only performed after verifying from said querying step that said inventory was stored accurately in said nonvolatile memory.

27. The method of claim 25 wherein if said verifying step indicates that said inventory was not stored accurately, performing a new inventory and transmitting said new inventory.

28. The method of claim 23 further comprising checking a status of a sensor.

29. The method of claim 28, wherein said determining step comprises performing a partial audit.

30. The method of claim 29 wherein if a result of said partial audit comprises an indication of validation of said inventory, said step of transmitting said inventory is performed following said step of performing a partial audit.

31. The method of claim 29, wherein, if a result of said partial audit comprises an indication of invalidation of said inventory, transmitting said inventory to the host computer with notice of invalidation and performing a background audit of said robotic data storage library.

32. The method in of claim 29, wherein, if a result of said partial audit comprises an indication of invalidation of said inventory, performing an off-line audit of said robotic data storage library to establish a new inventory and transmit said new inventory instead of said inventory.

33. The method of claim 28 wherein said transmission step is accomplished after said status of said sensor validates said inventory was stored accurately.

34. The method of claim 28 further comprising creating a new inventory if said status of said sensor indicates said inventory was stored inaccurately and said inventory for said transmission is replaced with said new inventory.

35. The method of claim 21 wherein said plurality of data storage elements includes a first and second type of data storage element and said storage locations are adapted to hold said first second type of data storage elements.

36. The method of claim 35 wherein said inventory includes a first inventory of said first type of data storage elements and a second inventory of said second type of data storage elements.

37. The method of claim 21 wherein one of said plurality of data storage elements is selected from one of the group consisting of: tape cartridge, tape magazine, disc drive pack, optical compact disc, flash memory device, magnetic disc drive, magneto-optical drive and floppy disc drive.

38. The method of claim 21 wherein said audit includes a transport unit location of where said transport unit is disposed.

39. A method for reducing an operational state for a robotic data storage library when turned on, said library comprising: a transfer unit, a plurality of storage locations each capable of accommodating a data storage element and at least one data transfer interface wherein said transfer unit is capable of moving one of said data storage elements from one of said accommodating storage locations to said at least one data transfer interface, the method comprising:

transitioning said library from a power-off state to a power-on state via a switch comprised by said library;

auditing said library to determine which of said locations are accommodating said data storage elements and which of said locations are not accommodating said data storage elements;

creating an inventory of said audit;

storing said inventory in a nonvolatile memory prior to said transitioning step; and transmitting said inventory to a host computer after said transitioning step.

40. The method of claim 39 further comprising transporting one of said data storage elements between one of said storage locations and said at least one data transfer interface; and updating said inventory in said nonvolatile memory following said transporting step.

* * * * *